UNITED STATES PATENT OFFICE.

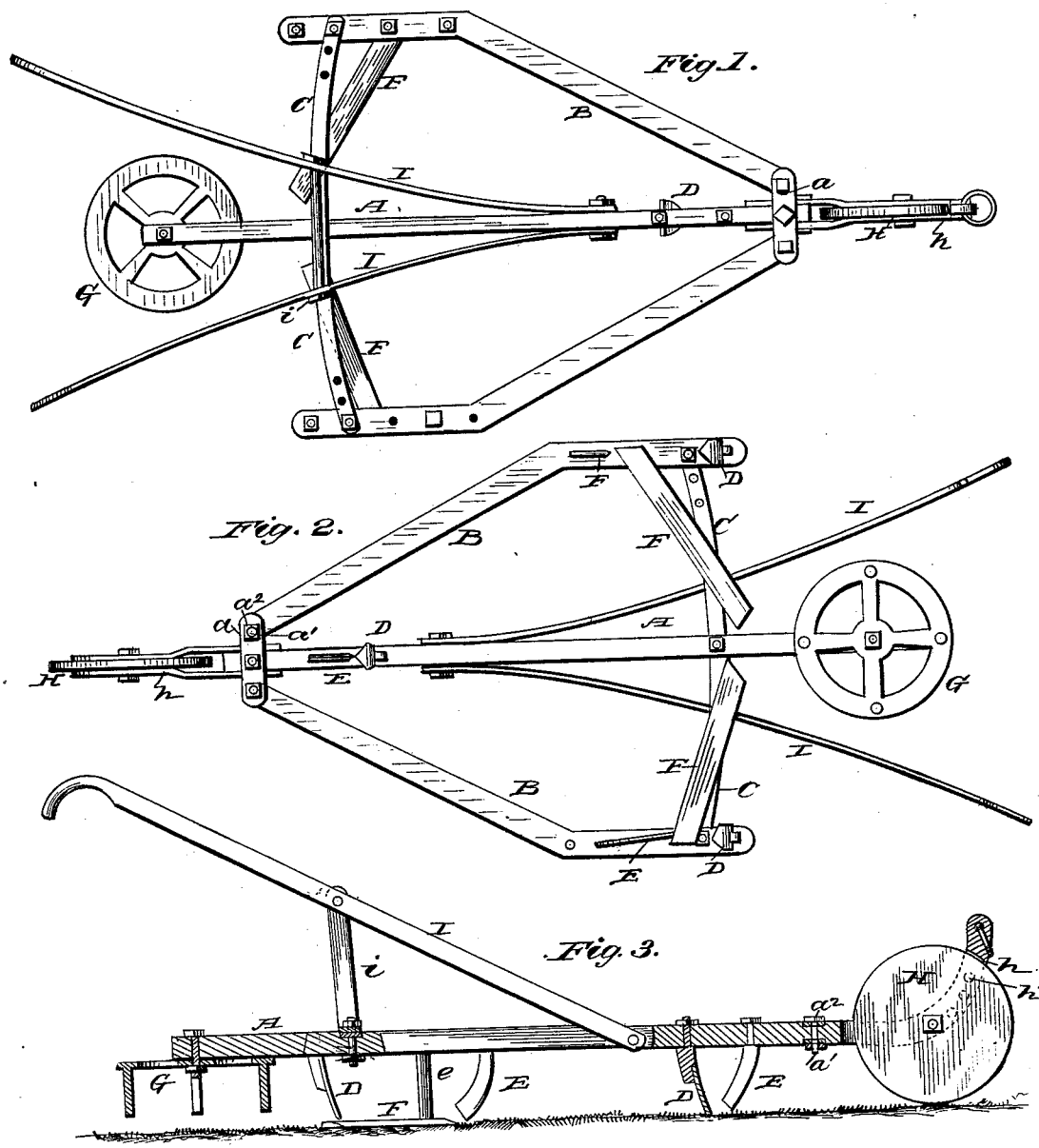

CHARLES McGREW, OF BLOOMINGTON, ILLINOIS.

IMPROVEMENT IN CULTIVATORS.

Specification forming part of Letters Patent No. 213,341, dated March 18, 1879; application filed December 11, 1878.

*To all whom it may concern:*

Be it known that I, CHARLES McGREW, of Bloomington, in the county of McLean, and in the State of Illinois, have invented certain new and useful Improvements in Cultivators; and do hereby declare that the following is a full, clear, and exact description thereof, reference being had to the accompanying drawings, and to the letters of reference marked thereon, making a part of this specification, and in which—

Figure 1 is a top-plan view; Fig. 2 is an inverted plan view, and Fig. 3 is a longitudinal sectional elevation, of my improved cultivator.

The object of my invention is to furnish an improved cultivator which shall be so constructed as to thoroughly loosen and pulverize the soil and destroy the grass and weeds; and to this end the invention consists in the general construction and combination of parts, as will be hereinafter fully described.

In the drawings, A represents a longitudinal central beam, and B B the diagonal side beams, of the frame, their front ends being connected to the front end of the central beam by the cross-bars $a\ a$ and bolts and nuts $a^1\ a^2$, all as clearly shown in Fig. 2, the rear ends of said beams being adjustably connected to the central beam by the perforated bars C C. The rear ends of the side beams are bent or formed at such an angle as to be parallel with the central beam, so that the rear parts, to which are attached the curved or convex knives and shovels, will run parallel with the rows of corn or other crops planted in rows.

D represents the cultivator-shovels, one of which is secured to the central beam, near its front end, and the others secured to the rear ends of the side beams. Secured to the beams, in front of each of the shovels D, is a curved or convex knife or blade, E, for the purpose of cutting the weeds and grass, and forming clear tracks for the shovels, thus obviating the liability of their becoming clogged.

F F represent two long diagonal and lateral cutting-blades, the outer ends of which are secured to the standards $e$ or knives E, just in front of the rear shovels, D. The blades F are designed to cut off the grass and weeds between the rows of corn, and such of the weeds that will work toward the center are scattered by the distributing-wheel G, journaled to the rear end of the central beam, and left lying on the top of the ground to wither and die.

The front end of the cultivator-frame is supported by the wheel H, which is journaled between the curved and perforated bars $h\ h$, that are secured to the front end of the central beam, the frame being adjusted at the front end thereof by journaling the wheel higher or lower in the holes $h'$ of the bars $h$.

I I represent the handles, the front ends of which are secured to the central beam, and supported in the desired position by the standards $i\ i$, secured to said beam.

The width of the cultivator, the elevation of the front part of the frame and the handles, and the incline of the lateral blades can each and all be adjusted as shown, or in any other manner deemed expedient in their manufacture.

The cultivator is designed to run between the rows of corn, the forward shovel in the center and the others near the rows of corn, the central shovel opening a small furrow in the center between the rows of corn, and the lateral blades cutting the weeds just below the surface of the ground, or rooting them up, so that they work near the center, and are scattered on top of the ground by the distributing-wheel in the rear of said blades, said wheel turning in either direction, and thus naturally relieving itself of the weeds that come in contact with it.

It will therefore be readily perceived that the rear shovels have clear ground to work in, as the lateral blades completely clear the ground of weeds, while the curved or convex knives in front of the rear shovels make an opening before the outer edge of each of the lateral blades, as well as before said rear shovels.

I do not desire to be limited to the arrangement of curved or convex blades, the lateral blades and shovels, in a single-horse cultivator adapted to run between the rows of corn, as the same arrangement can be applied to a two-horse or straddle-row cultivator by dispensing with the forward and rear wheels, H G, without departing from the spirit of my invention.

Having thus fully described my invention, what I claim as new, and desire to secure by Letters Patent, is—

1. The combination, in a cultivator, of the central beam provided with the curved or convex knife E and shovel D, and the side beams provided with the rear curved or convex knives, E, and rear shovels, and long diagonal and lateral cutting-blades F, the several parts arranged, relatively to each other, substantially as and for the purpose herein shown and described.

2. In a cultivator, the combination, with side beams, B, of the diagonal and lateral cutting-blades F F, the central beam, A, and distributing-wheel G, arranged in rear of said blades, substantially as and for the purpose specified.

3. The combination, in a cultivator, of the central beam provided with the curved or convex knife E, shovel D, and distributing-wheel G, and the side beams provided with the curved or convex knives E, rear shovels, D, and long diagonal and lateral cutting-blades F, substantially as herein shown and described.

In testimony that I claim the foregoing I have hereunto set my hand this 2d day of December, 1878.

CHARLES McGREW.

Witnesses:
 THOS. SLADE,
 H. E. HADLEY.